United States Patent [19]

Umeyama

[11] Patent Number: 4,950,205

[45] Date of Patent: Aug. 21, 1990

[54] FLYWHEEL WITH A TORSIONAL DAMPER

[75] Inventor: Mitsuhiro Umeyama, Toyota, Japan

[73] Assignee: Toyota Jidosha Kabushiki Kaisha, Toyota, Japan

[21] Appl. No.: 243,843

[22] Filed: Sep. 13, 1988

[30] Foreign Application Priority Data

| Sep. 14, 1987 | [JP] | Japan | 62-139367 |
| Sep. 16, 1987 | [JP] | Japan | 62-140058 |
| Sep. 17, 1987 | [JP] | Japan | 62-140916 |

[51] Int. Cl.$^5$ .......................... F16D 3/14; F16F 15/12
[52] U.S. Cl. ........................................ 464/68; 74/574; 192/106.2; 464/64
[58] Field of Search .............. 74/574; 192/106.2; 464/64, 66, 68

[56] References Cited

U.S. PATENT DOCUMENTS

| 2,042,570 | 6/1936 | Wemp . | |
| 2,437,537 | 3/1948 | Kelleher . | |
| 3,266,271 | 8/1966 | Stromberg | 464/64 |
| 4,002,043 | 1/1977 | Yoshida | 464/67 |
| 4,220,233 | 9/1980 | Ban et al. | 192/106.2 |
| 4,274,524 | 6/1981 | Nakane | 464/68 X |
| 4,351,168 | 9/1982 | Prince et al. | 464/64 |
| 4,468,207 | 8/1984 | Yoshida | 192/106.2 X |
| 4,485,909 | 12/1984 | Gatewood | 464/68 X |
| 4,611,701 | 9/1986 | Friedmann | 192/110 B |
| 4,618,048 | 10/1986 | Kobayashi | 464/68 X |
| 4,663,983 | 5/1987 | Kobayashi et al. | 192/106.2 X |
| 4,714,449 | 12/1987 | Woerner et al. | 464/68 |
| 4,724,719 | 2/1988 | Werner et al. | 464/68 X |
| 4,760,754 | 8/1988 | Friedmann | 464/68 X |

FOREIGN PATENT DOCUMENTS

| 3642877 | 7/1987 | Fed. Rep. of Germany | 464/68 |
| 2571461 | 8/1985 | France . | |
| 56-6676 | 2/1981 | Japan . | |
| 59-108848 | 7/1984 | Japan . | |
| 59-113548 | 7/1984 | Japan . | |
| 60-109635 | 6/1985 | Japan . | |
| 61-23542 | 2/1986 | Japan . | |
| 61-23543 | 2/1986 | Japan . | |
| 61-23544 | 2/1986 | Japan . | |
| 61-52423 | 3/1986 | Japan . | |
| 61-59024 | 3/1986 | Japan . | |
| 61-59040 | 3/1986 | Japan . | |
| 2103760 | 7/1982 | United Kingdom . | |
| 3410953 | 5/1985 | United Kingdom . | |
| 2157801 | 10/1985 | United Kingdom . | |
| 2160296 | 12/1985 | United Kingdom . | |
| 2163524 | 2/1986 | United Kingdom | 464/68 |
| 2180322 | 3/1987 | United Kingdom . | |
| 3627784 | 7/1987 | United Kingdom . | |

OTHER PUBLICATIONS

Automotive Engineering, vol. 93, p. 85.
Shock and Vibration Hand Book, vol. 2, McGraw Hill.

*Primary Examiner*—Daniel P. Stodola
*Attorney, Agent, or Firm*—Cushman, Darby & Cushman

[57] ABSTRACT

A flywheel device including driving and driven side flywheels, a first spring mechanism directly connecting the two flywheels with a predetermined torsional angular gap, and a second spring mechanism provided in parallel to the first spring mechanism and connecting the two flywheels via a friction mechanism provided in series with the second spring mechanism. The flywheel device has two vibrational characteristics between which the flywheel device changes its vibrational behavior while passing through the resonance speed to suppress amplification in vibration. The friction mechanism slips momentarily only while passing through the resonance speed and does not slip at a standard range of engine speeds. Due to the lack of slippage of the friction mechanism at the standard range of engine speeds, the torque variation absorbing effect of the flywheel device is greatly improved.

19 Claims, 12 Drawing Sheets

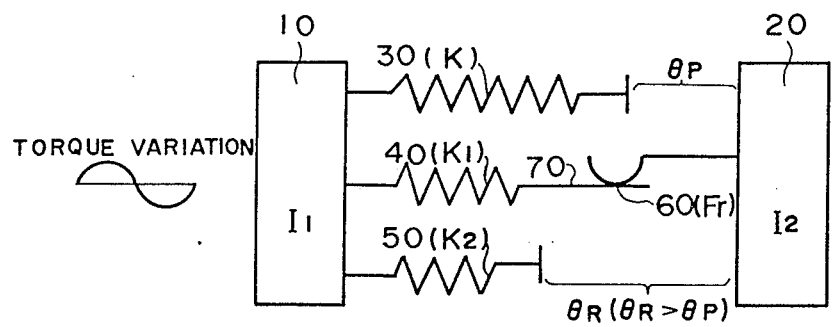
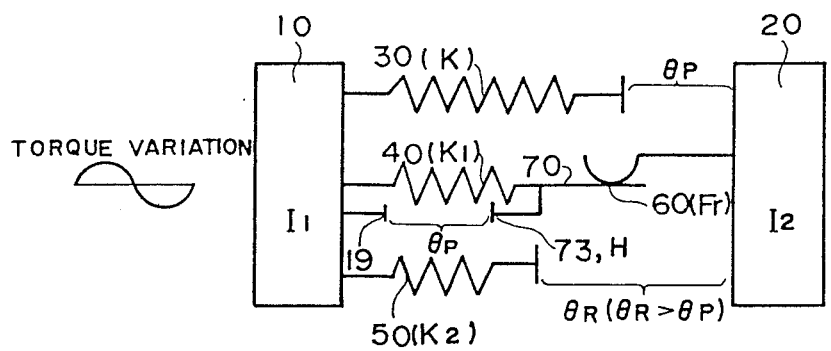
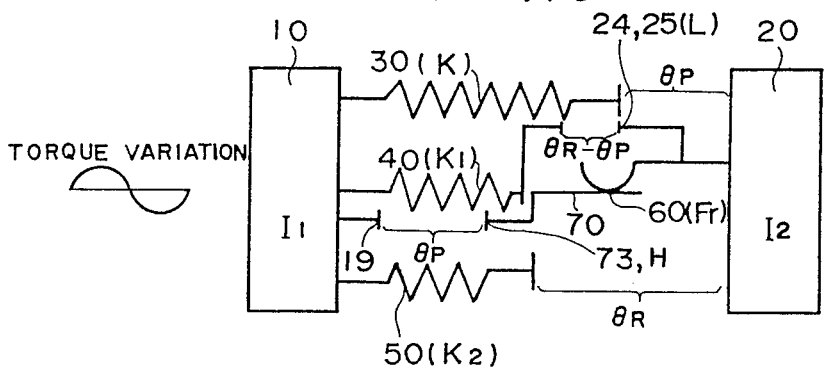

FLYWHEEL WITH A TORSIONAL DAMPER

BACKGROUND OF THE INVENTION

1. Field of the Invention

The present invention relates to flywheels and, more particularly, to a flywheel that can change vibrational behavior between two kinds of characteristics, thereby suppressing resonance and improving torque variation absorbing effects.

2. Description of the Related Art

Flywheels which comprise driving and driven side flywheels, a spring mechanism for connecting the driving and driven side flywheels, and a friction mechanism are well known, as shown, for example, in U.S. Pat. Nos. 4,468,207, 4,274,524, 4,351,168, 2,042,570, 4,445,876, 2,729,079, 2,437,537, 4,663,983, 4,220,233, 4,002,043; GB-A-2,000,257; DE-A-2,926,012; Automotive Engineering, vol. 93, page 85; Japanese Utility Model Publications SHO 61-23542, SHO 61-23543, SHO 61-23544, SHO 59-113548, SHO 59-108848, SHO 56-6676, and SHO 56-109635; and Japanese Patent Publications SHO 61-59040, SHO 61-59042, and SHO 61-52423; Shock and Vibration Hand Book, Vol. 2, McGraw Hill is useful in understanding the operation of an elastically connected Coulomb damper although it does not relate to flywheels.

The prior art flywheels have a single kind of vibrational characteristic generated by a single kind of spring mechanism, even if the spring mechanism itself includes a plurality of coil springs arranged in series or in parallel with each other. The single kind of vibrational characteristic causes the flywheel to have a single first mode resonance speed throughout the entire range of engine speeds. The resonance speed is usually set lower than the idling speed of the engine. As a result, when the engine speed passes through the resonance speed during a start-up or stopping of the engine, the torsional vibration of the flywheel will be amplified. To suppress the amplification in the torsional vibration, a continuously sliding friction mechanism (often called as a hysteresis mechanism) which continuously slides through the entire range of the engine speeds is disposed between the driving and driven side flywheels.

However, there are two problems with the above-described prior art flywheels. One problem is that a considerably large resonance remains at the resonance speed even if the friction mechanism is provided, because the characteristic of the flywheel is determined more by the spring mechanism than by the friction mechanism. The other problem is that the friction mechanism deteriorates the acceleration transmittance rate (which corresponds to a damping characteristic of the flywheel) in the standard range of engine speeds above the idling speed. This is because the frictional force due to the sliding friction mechanism exists over the entire range of engine speeds and because temporary sticking frequently occurs in the friction mechanism.

Another U.S. Application, Ser. No. 07/93,573 filed Sept. 4, 1987 relates to a flywheel designed to overcome the deficiencies of the above-described flywheel structure. However, as will become more apparent below, that application presents a structurally different, other solution to the problems of the prior art flywheel than the present invention.

SUMMARY OF THE INVENTION

An object of the invention is to provide a flywheel device with two kinds of vibrational characteristics having different resonance speeds so that the vibrational system of the flywheel device can momentarily change its vibrational behavior from one behavior to the other characteristic while passing through the resonance speed of the one characteristic of the vibrational system to thereby suppress the resonance during passing through the resonance speed of the one characteristic without using a continuously sliding friction mechanism.

Another object of the invention is to provide a flywheel device which improves its torque variation absorbing effect to a great extent at a standard range of engine speeds because it does not use a continuously sliding friction mechanism.

The above-mentioned objects are achieved by a flywheel device in accordance with the present invention which comprises: a driving side flywheel; a driven side flywheel arranged coaxial with respect to the driving side flywheel and rotatable relative to the driving side flywheel; a first spring mechanism connecting the driving and driven side flywheels with a predetermined torsional angular gap; and a second spring mechanism provided in parallel to the first spring mechanism as a spring arrangement so as to connect the driving and driven side flywheels via a friction mechanism which is arranged in series with the second spring mechanism as a vibrational system.

With the foregoing flywheel device, when a torsional angle generated between the driving and driven side flywheels is less than or equal to the predetermined angular gap, for example, $\theta_P$ between the first spring mechanism and the driven plate, the first spring mechanism does not operate and only the second spring mechanism operates. Thus, the spring constant of the vibrational system of the flywheel device is equal to the synthetic spring constant K1 of the second spring mechanism. On the other hand, when the torsional angle generated between the driving and driven side flywheels exceeds the angular gap $\theta_P$, the first spring mechanism operates and the friction mechanism begins to slip. The slippage of the friction mechanism makes the second spring mechanism substantially ineffective and, as a result, a spring constant of the vibrational system of the flywheel device momentarily changes to the synthetic spring constant K of the first spring mechanism.

At a standard range of engine speeds and at a range of very low engine speeds, torques acting on the flywheel device are usually small and, accordingly, the torsional angle generated between the driving and driven side flywheels does not exceed the predetermined angular gap $\theta_P$. Under this condition, the friction mechanism does not slip and only the second spring mechanism which has spring constant K1 operates to absorb the torque variations generated between the driving and driven side flywheels. Because there is no sliding of the friction mechanism, the torque variation absorbing effect by the second spring mechanism is greatly improved in comparison with the prior art flywheel device which has a continuously sliding friction mechanism. It is known that, in a perfect sticking between driving and driven side flywheels due to too great a frictional force of the frictional mechanism, no torque absorbing effect is obtained between the driving and driven side flywheels (because the torque transmittance rate becomes 1), and that a continuous sliding at the standard range of engine speeds is preferably avoided in order to obtain an excellent torque absorbing effect.

During start-up and stopping of the engine, the rotational speed of the flywheel device passes through the resonance speed of the system having the spring constant K1 of the second spring mechanism and, when the rotational speed of the flywheel device approaches the resonance speed of the characteristic of spring constant K1, the amplitude of relative rotation between the driving and driven side flywheels will increase. When the increasing torsional angle generated between the driving and driven side flywheels finally exceeds the predetermined angular gap $\theta_P$, the friction mechanism begins to slip to make the second spring mechanism ineffective and the first spring mechanism begins to operate. Under this condition, the vibrational system of the flywheel device has a synthetic spring constant K of the first spring mechanism which naturally differs from the synthetic spring constant K1 of the second spring mechanism. Thus, the vibrational system changes its characteristic from the characteristic of spring constant K1 to the characteristic of spring constant K while passing through the resonance speed of the characteristic of spring constant K1 to thereby greatly suppress the resonance. When the rotational speed of the flywheel device has passed through the resonance speed of the characteristic of spring constant K1 and changes from the resonance speed, the amplitude of relative rotation gradually decreases. When the decreasing amplitude becomes smaller than the predetermined angular gap $\theta_P$, the friction mechanism ceases slipping and the second spring mechanism again operates. This means that the flywheel device has no notable resonance speed throughout the entire range of engine speeds and that the flywheel device can pass through the resonance speed without being greatly amplified in vibration.

BRIEF DESCRIPTION OF THE DRAWINGS

The above and other objects, features and advantages of the present invention will become apparent and will be more readily appreciated from the following detailed description of the preferred exemplary embodiments of the invention taken in conjunction with the accompanying drawings, wherein like reference numerals designate corresponding parts in the various figures and in which:

FIG. 3 is a system diagram illustrating a vibrational system applicable to the flywheel device according to the first embodiment of the present invention;

FIG. 14 is a system diagram illustrating a vibrational system applicable to the flywheel device of the second embodiment of the present invention;

FIG. 19 is a system diagram illustrating a vibrational system applicable to the flywheel device according to the third embodiment of the present invention.

DETAILED DESCRIPTION OF THE PREFERRED EMBODIMENTS

Figure 1:
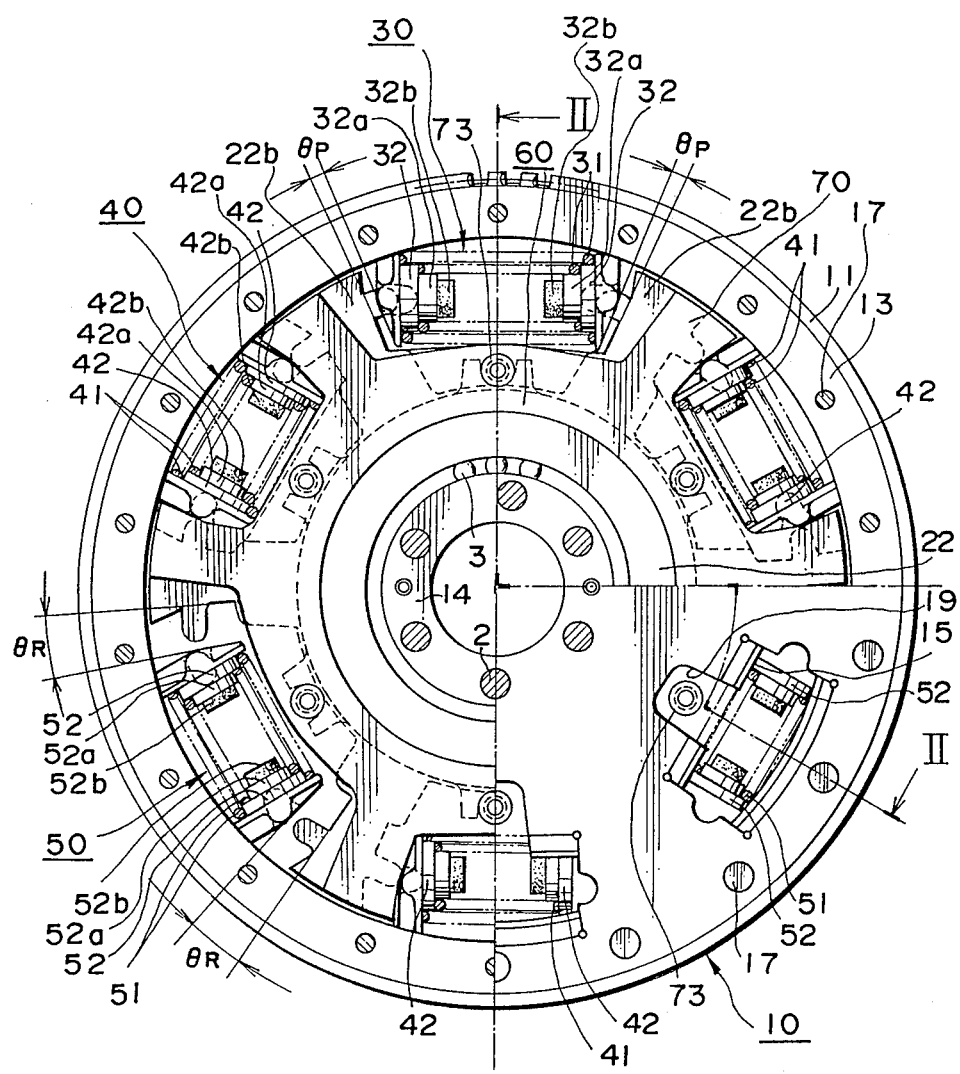
FIG. 1 is an elevational view of a flywheel device with a torsional damper in accordance with the first embodiment of the present invention.

Three embodiments of the present invention will be specifically discussed below. First, a flywheel device according to the first embodiment of the present invention will be explained with reference to FIGS. 1-12. As shown in FIG. 3 which illustrates the vibrational system of the flywheel device according to the first embodiment of the present invention, the flywheel device is generally divided into a driving side flywheel 10 defining a moment of inertia 11 and a driven side flywheel 20 defining a moment of inertia 12. The two inertia moments 11 and 12 are compatible. Driving side flywheel 10 and driven side flywheel 20 are arranged coaxially with respect to each other and rotatable relative to each other. Driving side flywheel 10 and driven side flywheel 20 are connected to each other in the rotational direction via a first spring mechanism 30 which connects driving side flywheel 10 and driven side flywheel 20 with a first predetermined torsional angular gap $\theta_P$. Driving side flywheel 10 and driven side flywheel 20 are also connected by a second spring mechanism 40 which is disposed in parallel to first spring mechanism 30 and which connects driving side flywheel 10 and driven side flywheel 20 via a friction mechanism 60. Friction mechanism 60 is arranged in series with second spring mechanism 40 as a vibrational system.

When the synthetic spring constants of first and second spring mechanisms 30 and 40 are K and K1, respectively, a predetermined frictional force of friction mechanism 60 is Fr and a torsional angle of, the first torsional angular gap with which first spring mechanism 30 connects driving and driven side flywheels 10 and 20 is $\theta_P$, the torsional angle of $\theta_P$ is determined by the following equation:

$$\theta_P = Fr/K1$$

The spring constant K of first spring mechanism 30 is selected so as to be less than the spring constant K1 of second spring mechanism 40. Preferably, the spring constant K1 of second spring mechanism 40 is 3 to 4 times greater than spring constant K of first spring mechanism 30.

Figure 2:
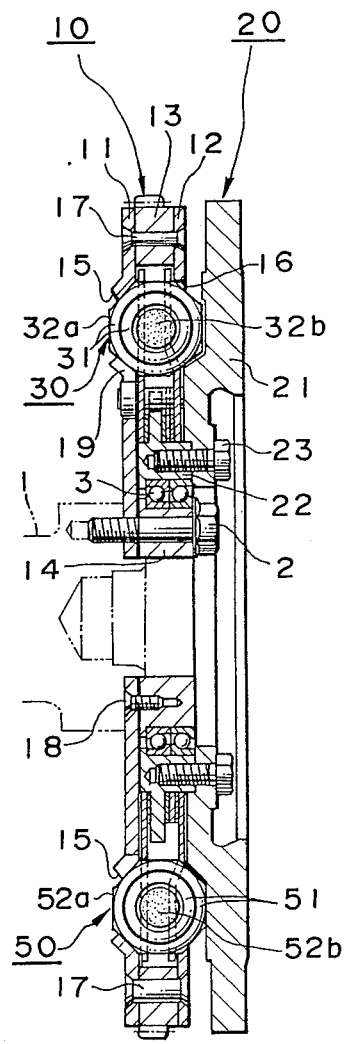
FIG. 2 is a cross-sectional view of the flywheel device of FIG. 1 taken along line II—II of FIG. 1.
Figure 11:
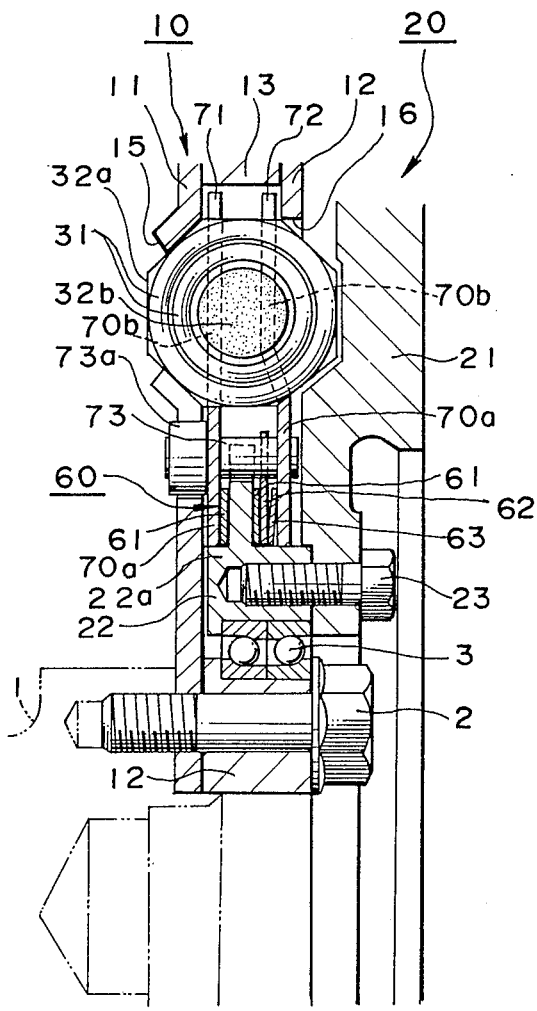
FIG. 11 is a cross-sectional view of a friction mechanism commonly applicable to the first, second and third embodiments of the present invention, except a portion of a rivet which functions as means for forcibly sliding a friction mechanism in the second and third embodiments.
Figure 10:
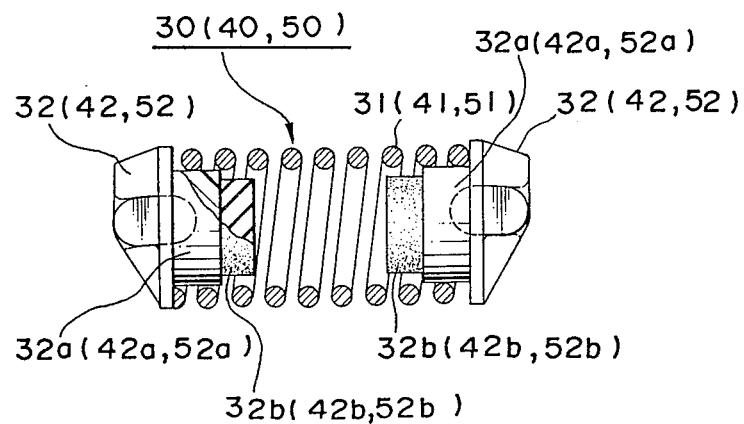
FIG. 10 is a cross-sectional view of a spring mechanism generally commonly applicable to first, second and third spring mechanisms which selectively appear in first, second and third embodiments of the present invention.

As shown in FIGS. 1 and 2, the first spring mechanism 30 comprises at least one first coil spring 31 and a spring seat 32 disposed at each end of first coil spring 31. As shown in FIG. 10, each spring seat 32 includes a seat portion 32a constructed of hard synthetic resin and a cushion 32b constructed of elastic rubber. Cushions 32b of spring seats 32 disposed at the ends of first coil spring 31 face each other so that when first coil spring 31 is greatly compressed, the facing cushions 32b are brought into contact with each other and are deformed. Similarly, spring mechanism 40 comprises at least one second coil spring 41 a spring seat 42 disposed at each end of second coil spring 41. Each spring seat 42 includes a seat portion 42a constructed of hard synthetic resin and a cushion 42b constructed of elastic rubber. Cushions 42b of spring seats 42 disposed at the ends of each second coil spring 41 face each other so that when second coil spring 41 is greatly compressed, the facing cushions 42b are brought into contact with each other and are deformed.

As shown in FIGS. 1 and 3, the flywheel device may further comprise a third spring mechanism 50 connecting the driving and driven side flywheels 10 and 20 with a second predetermined torsional angular gap $\theta_R$ larger than the first torsional angular gap $\theta_P$ with which first spring mechanism 30 connects the driving and driven side flywheels 10 and 20. Third spring mechanism 50 has a synthetic spring constant K2.

As shown in FIG. 10, third spring mechanism 50 comprises at least one third coil spring 51 and a spring seat 52 disposed at each end of each third coil spring 51. Each spring seat 52 includes a seat portion 52a constructed of hard synthetic resin and a cushion 52b constructed of elastic rubber. Cushions 52b disposed at the ends of each third coil spring 51 face each other so that when the third coil spring 51 is greatly compressed, the facing cushions 52b are brought into contact with each other and are deformed.

As shown in FIG. 1, first spring mechanism 30 has one first coil spring 31 and second spring mechanism 40 has three second coil springs 41. When third spring mechanism 50 is provided, third spring mechanism 50 has two third coil springs 51. These spring mechanisms are arranged at a substantially common circle and extend in a circumferential direction of the flywheel device. These spring mechanisms constitute dampers of the flywheel device which dampen relative rotations between driving and driven side flywheels 10 and 20 through vibration suppressing effects due to the springs. The synthetic spring constants K, K1 and K2 of the first, second and third spring mechanisms 30, 40 and 50, respectively, are determined as synthetic spring constants of the first, second and third coil springs 31, 41 and 51, respectively. For example, when 3 second coil springs 41 are provided in number, each second coil spring 41 has a spring constant K1/3 so that the parallel combination of the three second coil springs 41 defines the synthetic spring constant K1 of second spring mechanism 40.

Figure 12:
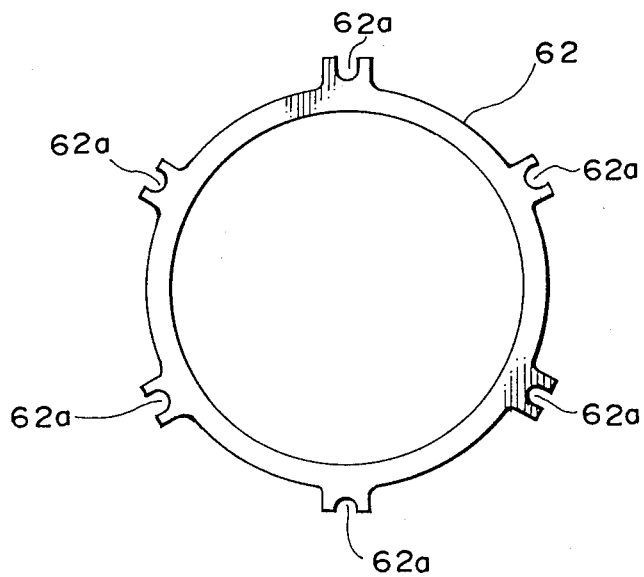
FIG. 12 is an elevational view of a thrust plate commonly applicable to the flywheel devices of the first, second and third embodiments of the present invention.

As shown in FIGS. 1, 2 and 12, friction mechanism 60 includes a thrust lining 61 constructed of abrasive material, a thrust plate 62, and a cone spring 63 for generating the predetermined frictional force Fr of friction mechanism 60. Thrust lining 61, thrust plate 62 and cone spring 63 are disposed between the driving and driven side flywheels 10 and 20 in the axial direction of the flywheel device. Thrust plate 62 is an annular member having a plurality of protrusions protruding radially outward where slots 62a are formed. Slots 62a engage with rivets connecting control plate elements of a control plate so as to rotate together with the control plate, as described more fully below.

As shown in FIG. 2, driving side flywheel 10 is coupled to a crankshaft 1 by bolts 2. Driving side flywheel 10 comprises a ring gear 13, an inner ring 14 disposed radially inside and radially spaced from ring gear 13, and a pair of driving plates 11 and 12 fixedly coupled to ring gear 13 by rivets 17. Inner ring 14 is fixedly coupled to one of the driving plates 11 by screws 18 or bolts.

Figure 6:
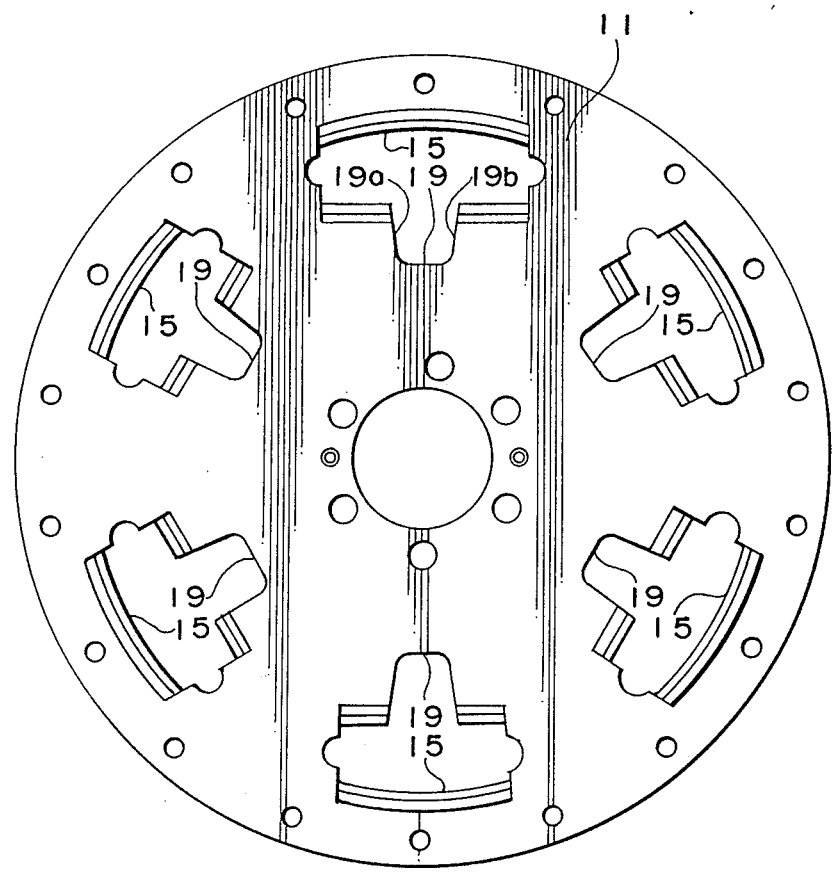
FIG. 6 is an elevational view of a first driving plate commonly used in the flywheel devices according to the first, second and third embodiments of the present invention.
Figure 7:
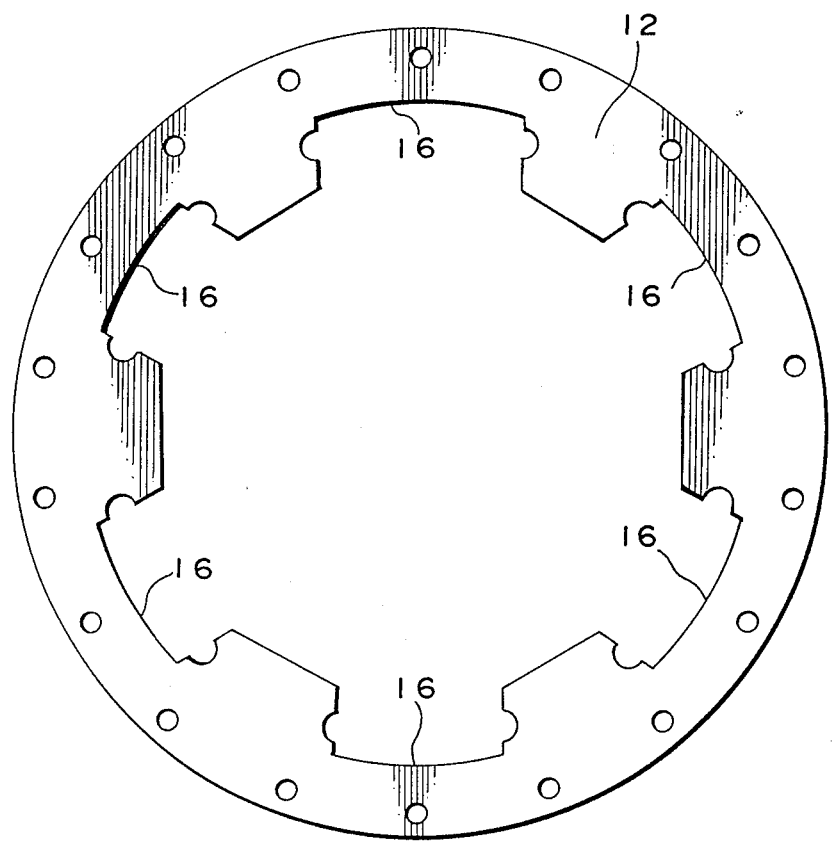
FIG. 7 is an elevational view of a second driving plate commonly used in the flywheel devices according to the first, second and third embodiments of the present invention.

As shown in FIG. 6, one of the driving plates 11 has circumferentially elongated openings 15. Ends of elongated openings 15 detachably engage with the first, second and third spring mechanisms 30, 40 and 50. As shown in FIG. 7, the other of the driving plates 12 has circumferentially prolonged slots 16. Ends of elongated slots 16 detachably engage with the first, second and third spring mechanisms 30, 40 and 50.

Figure 8:
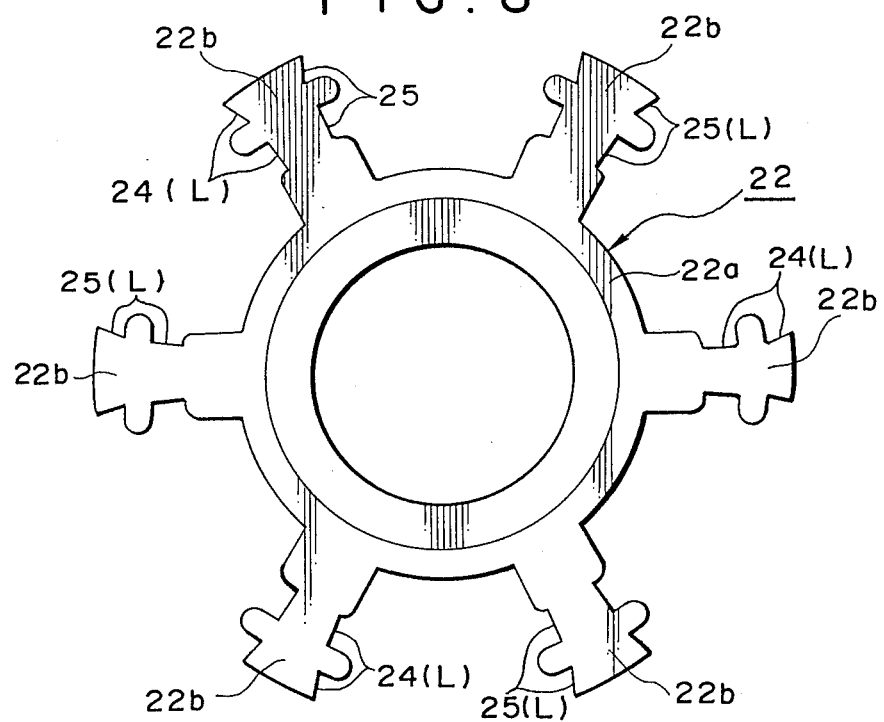
FIG. 8 is an elevational view of a driven plate commonly used in the flywheel devices according to the first, second and third embodiments of the present invention, except portions of arms which function as members for forcibly operating a second spring mechanism in the flywheel device according to the third embodiment of the present invention.

As shown in FIG. 2, driven side flywheel 20 is supported by inner ring 14 of driving side flywheel 10 via a bearing 3 so as to be rotatable relative to driving side flywheel 10. Driven side flywheel 20 is coupled to a power train of a vehicle via a clutch mechanism (not shown). Driven side flywheel 20 comprises a flywheel body 21 arranged so as to oppose driving side flywheel 10 in the axial direction of the flywheel device and a driven plate 22 fixedly coupled to the flywheel body 21 by a bolt 23. As shown in FIG. 8, driven plate 22 includes an annular portion 22a and a plurality of arms 22b extending radially outwardly from annular portion 22a. Annular portion 22a of driving plate 22 slidably engages friction mechanism 60 and arms 22b of driven plate 22 detachably engage first spring mechanism 30 with the predetermined torsional angular gap $\theta_P$. Arms 22b of driven plate 22 also detachably engage third spring mechanism 50 with the second torsional angular gap $\theta_R$ larger than the angular gap $\theta_P$ with which first spring mechanism 30 connects the driving and driven side flywheels 10 and 20.

The flywheel device further comprises a control plate 70 arranged between driving and driven side flywheels 10 and 20 as a vibrational system so as to be rotatable relative to the driving and driven side flywheels 10 and 20 and so as to connect second spring mechanism 40 and friction mechanism 60.

Figure 9:
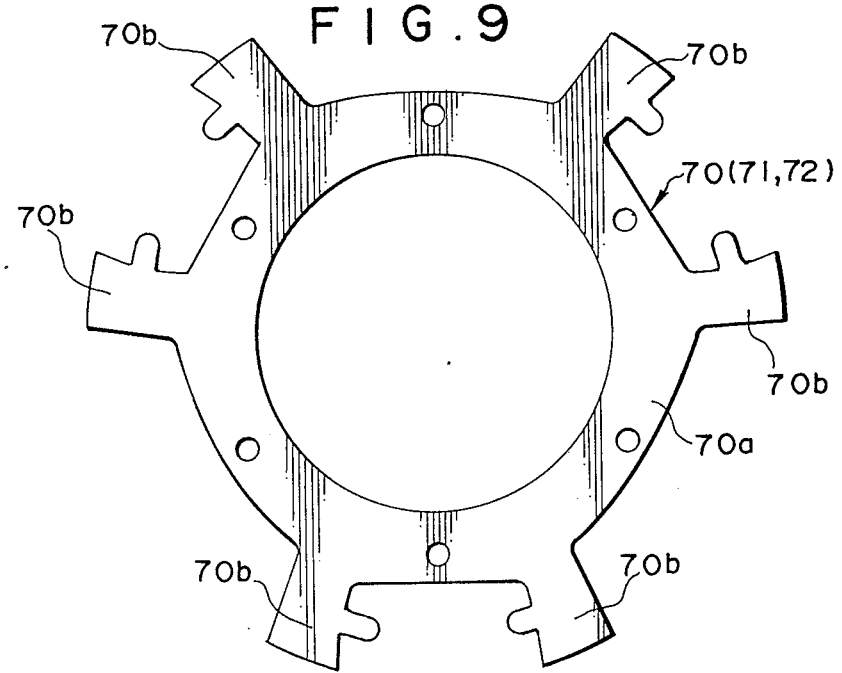
FIG. 9 is an elevational view of a control plate commonly used in the flywheel devices according to the first, second and third embodiments of the present invention.

As shown in FIG. 9, control plate 70 includes a pair of control plate elements 71 and 72 disposed substantially in parallel with each other and coupled to each other by a rivet 73 (see FIG. 2). Control plate 70 includes an annular portion 70a and a plurality of arms 70b extending radially outwardly from annular portion 70a. Annular portion 70a of control plate 70 slidably engages friction mechanism 60 and arms 70b of control plate 70 detachably engage second spring mechanism 40.

Figure 4:
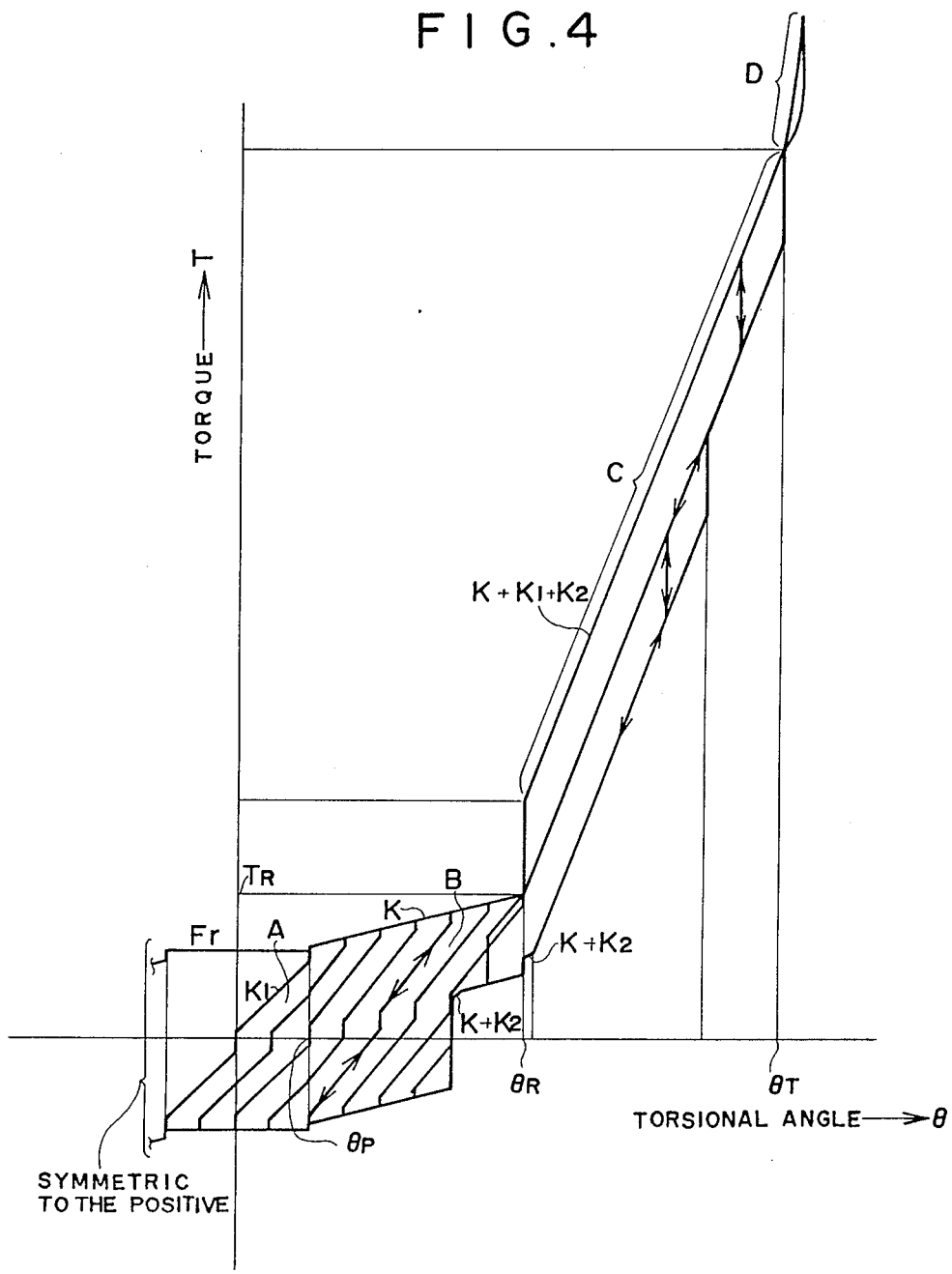
FIG. 4 is a system diagram illustrating a torsional angle-torque characteristic commonly applicable to the flywheel devices according to the first, second and third embodiments of the present invention.
Figure 5:
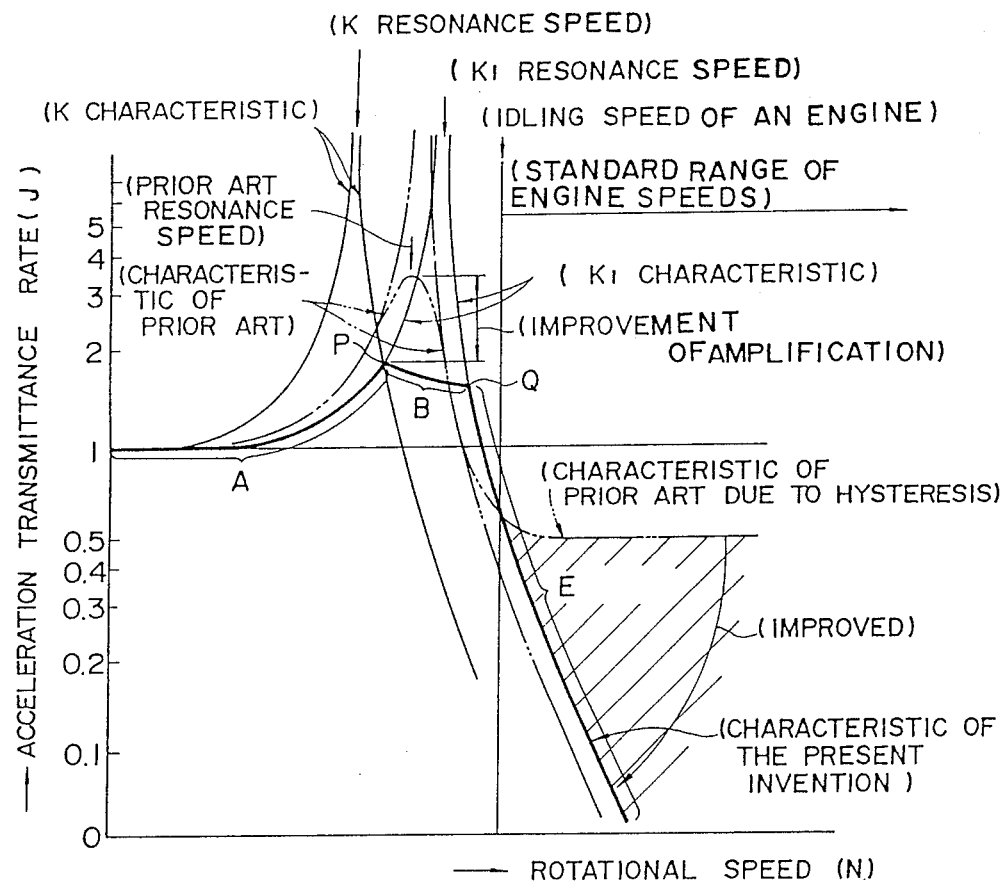
FIG. 5 is a graph illustrating a rotational speed-acceleration transmittance rate characteristic commonly applicable to the flywheel devices according to the first, second and third embodiments of the present invention.

The flywheel device according to the first embodiment of the present invention operates according to the torsional angle-torque characteristic illustrated in FIG. 4 and according to the engine speed-acceleration transmittance rate characteristic illustrated in FIG. 5.

As shown in FIG. 4, when the torsional angle between the driving and driven side flywheels 10 and 20 is less than the predetermined angular gap $\theta_P$ with which first spring mechanism 30 connects driving and driven side flywheels 10 and 20, friction mechanism 60 does not slip and only second spring mechanism 40 operates. This is illustrated by range A, of FIG. 4. When the torsional angle between the driving and driven side flywheels 10 and 20 exceeds the predetermined angular gap $\theta_P$, friction mechanism 60 slips and makes second spring mechanism 40 ineffective. However, when the flywheel device vibrates in a reverse rotational direction, friction mechanism 60 does not slip and second spring mechanism 40 operates. When friction mechanism 60 slips, only first spring mechanism 30 operates. This is illustrated by range B of FIG. 4. Slippage of friction mechanism 60 occurs momentarily as will be described with reference to FIG. 5 hereinafter. When the torsional angle between the driving and driven side flywheels 10 and 20 is further increased and the torsional angle exceeds the predetermined angular gap $\theta_R$ provided between third spring mechanism 50 and driven side flywheel 20, third spring mechanism 50 begins to operate. This is illustrated by range C of FIG. 4. When the torsional angle is even further increased and reaches a torsional angle $\theta_T$ where cushions 32b, 42b and 52b are brought into contact with the respective opposite cushions and are deformed, the spring constant of the flywheel device is greatly increased. This is illustrated by range D of FIG. 4.

As shown in FIG. 5, the vibrational system of the flywheel device generally has two vibrational characteristics, that is, a characteristic (K characteristic) having the synthetic spring constant K of fist spring mechanism 30 and a characteristic (K1 characteristic) having the synthetic spring constant K1 of second spring mechanism 40. The two characteristics have resonance speeds different from each other. When relative rotation, that is, the torsional angle between the driving and driven side flywheels 10 and 20 is less than the predetermined angular gap $\theta_P$, friction mechanism 60 does not slip and the flywheel device operates according to the K1 characteristic. At a standard range of engine speeds above the idling speed of the engine and at a range of very low engine speeds, the torsional rotational angle between the driving and driven side flywheels 10 and 20 is usually small and the flywheel device operates according to the K1 characteristic. Under this condition, second spring mechanism 40 operates and absorbs torque variations generated between the driving and driven side flywheels 10 and 20. This condition is illustrated by ranges A and E of FIG. 5 which correspond to range A of FIG. 4. Under this range E, no slippage of friction mechanism 60 occurs and, as a result, the torque absorbing effect is greatly improved. In FIG. 5, two-dotted chain line illustrates the characteristic of the prior art flywheel which has a single resonance speed and a continuously sliding friction mechanism. The difference between the characteristic of the flywheel device of the present invention and the characteristic of the prior art flywheel device, that is, the hatched portion of FIG. 5 illustrates an improvement in acceleration transmittance rate according to the present invention.

When the engine speed approaches the resonance speed of the K1 characteristic, the relative rotation or the torsional angle between the driving and driven side flywheels 10 and 20 will increase. When the torsional angle finally exceeds the predetermined angular gap $\theta_P$, friction mechanism 60 begins to slip to make second spring mechanism 40 ineffective and, at the same time, first spring mechanism 30 begins to operate. The vibrational system changes its characteristic from point P to point Q (at the time of an engine start-up) or from point Q to point P (at the time of an engine stop) accompanied by a slippage of friction mechanism 60, that is, from the K1 characteristic to the K characteristic. The K characteristic has a resonance speed different from the resident speed of the K1 characteristic. Therefore, the vibrational system having changed its characteristic to the K characteristic is no longer amplified in vibration while passing through the resonance speed of the Kl characteristic. When the engine speed changes from the resonance speed of the K1 characteristic accompanied with a slippage of friction mechanism 60, the amplitude of vibration decreases and the torsional angle between the driving and driven side flywheels 10 and 20 decreases to a torsional angle less than the predetermined angular gap $\theta_P$. At the same time, friction mechanism 60 stops slipping to make second spring mechanism 40 effective and first spring mechanism 30 stops operating. In this way, the flywheel device again operates according to the original characteristic Kl. As is apparent from the above explanation, friction mechanism 60 slips only momentarily while passing through the resonance speed of the K1 characteristic for the purpose of changing the resonance speed of the vibrational system from the resonance speed of the K1 characteristic to the resonance speed of the K characteristic to thereby suppress resonance. The resonance suppression due to a change in spring constant is usually more effective than the resonance suppression due to a continuously sliding friction mechanism, and therefore, an improvement in resonance suppression is also obtained according to the present invention as shown in FIG. 5.

Next, a flywheel device according to the second embodiment of the present invention will be described with reference to FIGS. 13–17. The flywheel device of the second embodiment has substantially the same elements as those of the flywheel device according to the first embodiment except friction mechanism forcibly sliding members. Therefore, a discussion of the portions of the flywheel device according to the second embodiment which are the same as those of the flywheel device according to the first embodiment will be omitted, and only the elements different from those of the first embodiment will be explained below.

Figure 13:
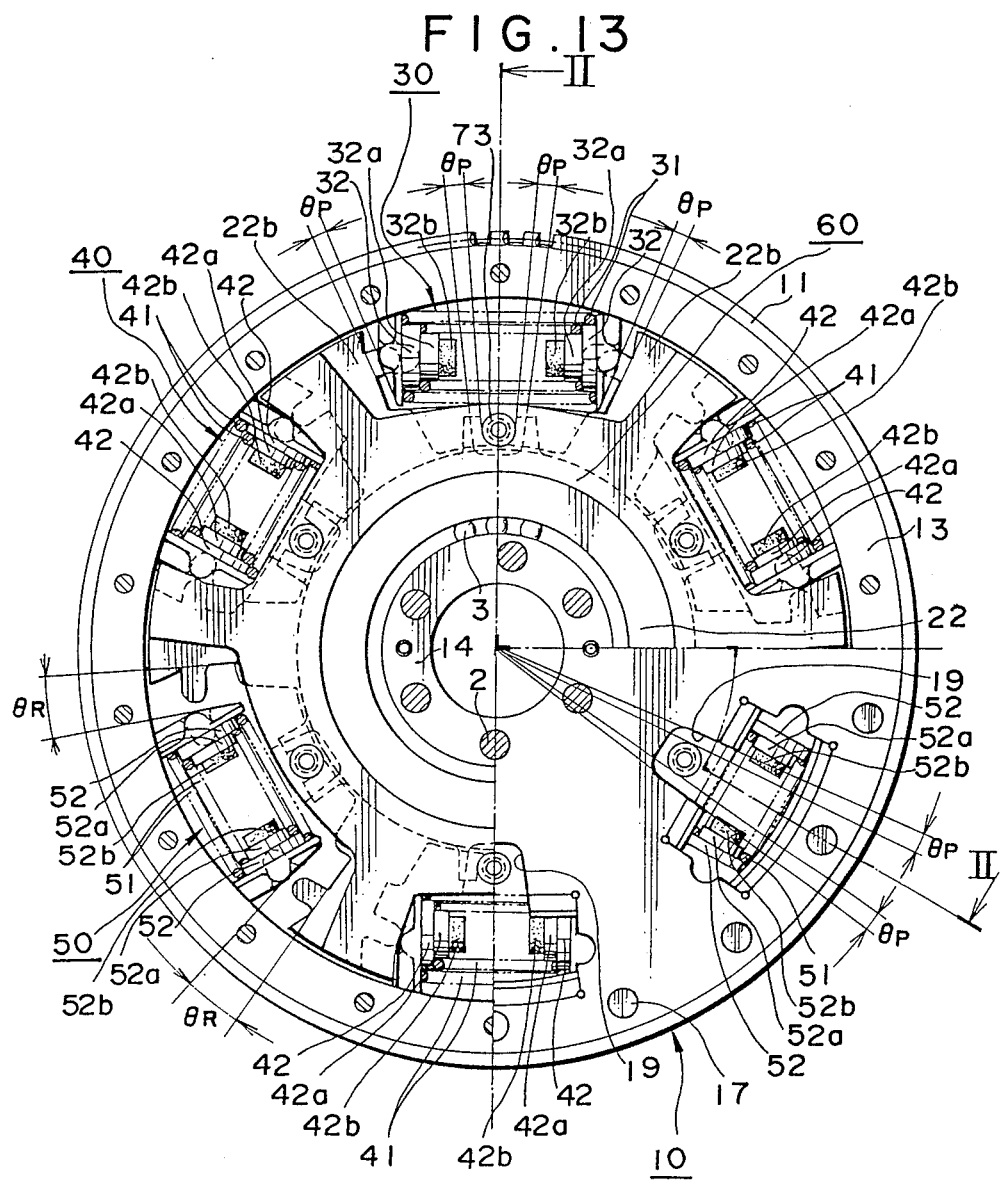
FIG. 13 is an elevational view of a flywheel device according to the second embodiment of the present invention.
Figure 15:
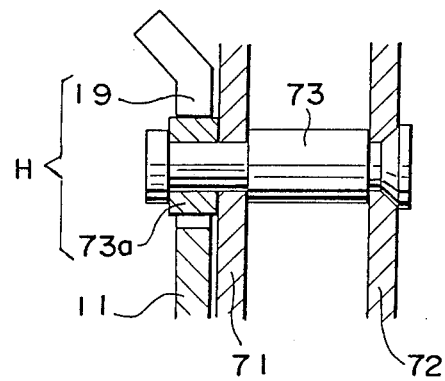
FIG. 15 is a cross-sectional view of a first example of a means for forcibly sliding the friction mechanism commonly applicable to the flywheel devices according to the second and third embodiments of the present invention.
Figure 16:
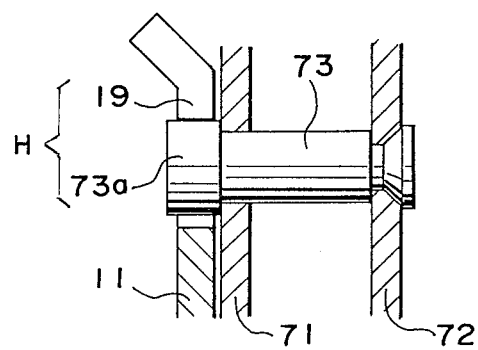
FIG. 16 is a cross-sectional view of a second example of a means for forcibly sliding the friction mechanism commonly applicable to the flywheel devices according to the second and embodiments of the present invention.
Figure 17:
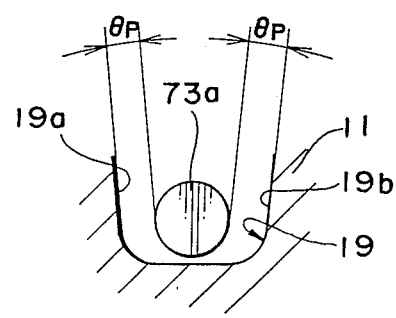
FIG. 17 is an elevational view of the means for forcibly sliding of FIGS. 15 and 16.

In the second embodiment, the flywheel device further comprises members H, provided against a torque transmitting path including the series combination of second spring mechanism 40 and friction mechanism 60, for forcibly sliding friction mechanism 60 at torsional angles larger than the torsional angle $\theta_P$ of the predetermined angular gap with which first spring mechanism 30 connects the driving and driven side flywheels 10 and 20. More particularly, as shown in FIGS. 15-17, rivet 73 connecting control plate elements 71 and 72 of control plate 70 extends in the axial direction of the flywheel device and further extends from one control plate element 71 toward one driving plate 11 to form a rivet head 73a. Rivet head 73a may be integral with rivet 73 itself as shown in FIG. 16 or may be separate from rivet 73 and coupled to rivet 73 as shown in FIG. 15. As shown in FIG. 6, one driving plate 11 has a radially extending slot 19 which opens to circumferentially elongated opening 15. Radially extending slot 19 is defined by sides 19a and 19b such that a torsional angular gap equal in gap size to the angular gap $\theta_P$ is provided between each side 19a, 19b of radially extending slot 19 and rivet head 73a, as shown in FIG. 13. The members H for forcibly sliding friction mechanism 60 comprise rivet head 73a and sides 19a and 19b of radially extending slot 19 formed in driving plate 11. FIG. 14 illustrates the vibrational system of the second embodiment where the members H for forcibly sliding friction mechanism 60 are added in comparison with the vibrational system of the first embodiment illustrated in FIG. 3.

Due to the friction mechanism forcibly sliding members H which include the members 73a, 19a and 19b, even if the predetermined frictional force Fr of friction mechanism 60 changes due to abrasion of thrust lining 61 of friction mechanism 60, a slippage beginning point P of FIG. 5 does not change and, as a result, a stable operation of friction mechanism 60 and a stable characteristic change between the K1 characteristic and the K characteristic can be obtained.

Figure 18:
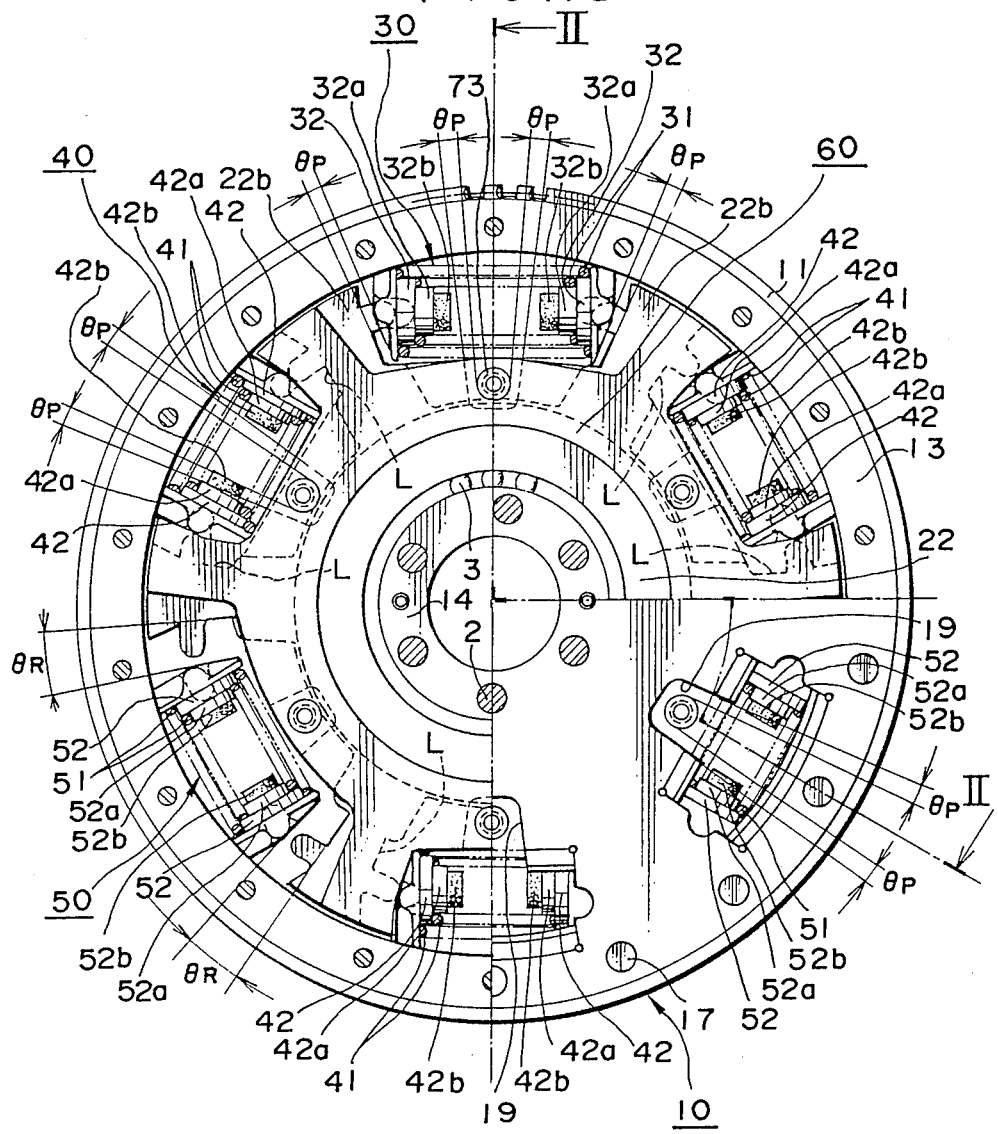
FIG. 18 is an elevational view of a flywheel device according to the third embodiment of the present invention.

Next, a flywheel device according to the third embodiment of the present invention will be discussed with reference to FIGS. 18 and 19. The flywheel device of the third embodiment has substantially the same elements as those of the flywheel device according to the second embodiment except a second spring mechanism forcibly operating member. Therefore, a discussion of the portions of the flywheel device according to the third embodiment which are the same as those of the flywheel devices according to the first and second embodiments will be omitted and only the elements different from those of the first and second embodiments will be explained below.

In the third embodiment, the flywheel device further comprises a member L, provided in a torque transmitting path including the series combination of second spring mechanism 40 and friction mechanism 60, for forcibly and again operating second spring mechanism 40 at torsional angles not less than a predetermined second torsional angle $\theta_R$ which is larger than the torsional angle $\theta_P$.

More particularly, as shown in FIG. 8 each arm 22b of driven plate 22 has opposite sides 24 and 25. A predetermined torsional angular gap with a torsional angle equal to the difference between the second predetermined torsional angle $\theta_R$ and the torsional angle $\theta_P$ is provided between second spring mechanism 40 and each side 24, 25 of the arm 22b which circumferentially opposes second spring mechanism 40. Member L includes sides 24 and 25 of arms 22b of driven plate 22.

When third spring mechanism 50 is provided, the torsional angle of the second angular gap $\theta_R$ provided between third spring mechanism 50 and driven side flywheel 20 is equal to the angle provided between side 24, 25 of arm 22b of driven plate 22 and second spring mechanism 40.

Due to member L, second spring mechanism 40 is again made effective in operation at range C of FIG. 4, even if friction mechanism 60 is slipping, and all spring mechanisms 30 and 40 (and 50 when third spring mechanism 50 is provided) operate effectively at range C of FIG. 4. As a result, a high torque can be transmitted at a large torsional angle range such as range C. This means that the flywheel device according to the third embodiment can be used for a flywheel device which receives a large torque.

According to the flywheel device according to any embodiment of the present invention, the following effects are obtained:

First, the torque variation absorbing effect is improved at a standard range of engine speeds because no slippage of friction mechanism 60 occurs at the standard range of engine speeds.

Second, the flywheel device has no notable resonance speed throughout the entire range of engine speeds because the flywheel device has two characteristics and changes its vibrational behavior from the K1 vibrational behavior to the K characteristic while passing through the resonance speed of the K1 characteristic.

Third, because first spring mechanism 30 is only required to operate at torsional angles larger than the predetermined torsional angle $\theta_P$, first spring mechanism 30 can be made smaller than second spring mechanism 40 and a space for providing first spring mechanism 30 can be made small. This enables compact design of the flywheel device and easily provides a space for mounting a third spring mechanism 50 when a third spring mechanism 50 is provided. Provision of third spring mechanism 50 increases the torque transmitting capacity of the flywheel device.

Although only three embodiments of the present invention have been described in detail, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A flywheel device with a torsional damper comprising:
   a driving side flywheel;
   a driven side flywheel arranged coaxially with respect to the driving side flywheel and rotatable relative to the driving side flywheel;
   a first spring mechanism connecting the driving and driven side flywheels with a predetermined torsional angular gap; and a second spring mechanism connecting the driving and driven side flywheels via a friction mechanism arranged in series with the second spring mechanism as a vibrational system, the series combination of the second spring mechanism and the friction mechanism being provided in parallel to the first spring mechanism, the second mechanism having a synthetic spring constant greater than a synthetic spring constant of the first spring mechanism.

2. The flywheel device according to claim 1, further comprising means, provided against a torque transmitting path including the series combination of the second spring mechanism and the friction mechanism, for forcibly sliding the friction mechanism at torsional angles greater than or equal to a torsional angle of the predetermined angular gap with which the first spring mechanism contacts the driving and driven side flywheels.

3. The flywheel device according to claim 1, further comprising means, provided against a torque transmitting path including the series combination of the second spring mechanism and the friction mechanism, for forcibly operating the second spring mechanism at torsional angles greater than or equal to a predetermined second torsional angle which is larger than a torsional angle of the predetermined angular gap with which the first spring mechanism connects the driving and driven side flywheels.

4. The flywheel device according to any one of claims 1, 2 or 3, wherein when a synthetic spring contact of the second spring mechanism, a predetermined frictional force of the friction mechanism, and a torsional angle of the torsional angular gap are K1, Fr, and $\theta_P$, respectively, the torsional angle $\theta_P$ is determined by the following equation:

$$\theta_P = Fr/K1.$$

5. The flywheel device according to any one of claims 1, 2 or 3, wherein a synthetic spring constant of the first spring mechanism is less than a synthetic spring constant of the second spring mechanism.

6. The flywheel device according to any one of claims 1, 2 and 3, wherein a synthetic spring constant of the second spring mechanism is three to four times greater than a synthetic spring constant of the first spring mechanism.

7. The flywheel device according to any one of claims 1, 2 and 3, wherein the first spring mechanism comprises at least one first coil spring and a spring seat disposed at each end of each first coil spring, each of the spring seats including a seat portion constructed of hard synthetic resin and a cushion constructed of elastic rubber, and wherein the second spring mechanism comprises at least one second coil spring and a spring seat disposed at each end of each second coil spring, each of the spring seats of the second spring mechanism including a seat portion constructed of hard synthetic resin and a cushion constructed of elastic rubber.

8. The flywheel device according to any one of claims 1, 2 and 3, further comprising a third spring mechanism connecting the driving and driven the flywheels with a second predetermined torsional angular gap greater than the torsional angular gap with which the first spring mechanism connects the driving and driven side flywheels.

9. The flywheel device according to claim 8, wherein the third spring mechanism comprises at least one third coil spring and a spring seat disposed at each end of each third coil spring, each of the spring seats including a seat portion constructed of hard synthetic resin and a cushion constructed of elastic rubber.

10. The flywheel device according to claim 8, wherein the first spring mechanism comprises one first coil spring, the second spring mechanism comprises three second coil springs, and the third spring mechanism comprises two third coil springs.

11. The flywheel device according to claim 8, wherein the driving side flywheel comprising a ring gear, and inner ring disposed radially spaced from the ring gear, and a pair of driving plates fixedly coupled to the ring gear, the inner ring being fixed to one of the driving plates, and wherein each driving plate has circumferentially elongated openings or slots, ends of the elongated openings or slots detachably engaging the first, second and third spring mechanisms.

12. The flywheel device according to claim 8, wherein the driven side flywheel comprises a flywheel body arranged so as to oppose the driving side flywheel in an axial direction of the flywheel device and a driven plate fixedly coupled to the flywheel body, the driven plate comprising an annular portion and a plurality of arms extending radially outwardly from the annular portion, the annular portion of the driven plate slidably engaging the friction mechanism and the arms of the driven plate detachably engaging the first spring mechanism with the predetermined torsional angular gap and detachably engaging with the third spring mechanism with the second torsional angular gap larger than the angular gap with which the first spring mechanism connects the driving and driven side flywheels.

13. The flywheel device according to any one of claims 1, 2 and 3, wherein the friction mechanism comprises a thrust lining, a thrust plate, and a cone spring for generating the predetermined frictional force of the friction mechanism, the thrust lining, the thrust plate and the cone spring being disposed between the driving and driven side flywheels in an axial direction of the flywheel device.

14. The flywheel device according to any one of claims 1, 2 and 3, wherein the driving side flywheel comprises a ring gear, an inner ring disposed radially inside and radially spaced from the ring gear, and a pair of driving plates fixedly coupled to the ring gear, the inner ring being fixedly coupled to one of the driving plates.

15. The flywheel device according to any one of claims 1, 2 and 3, wherein the driven side flywheel comprises a flywheel body arranged so as to oppose the driving side flywheel in an axial direction of the flywheel device and a driven plate fixedly coupled to the flywheel body, the driven plate comprising an annular portion and a plurality of arms extending radially outwardly from the annular portion, the annular portion of the driven plate slidably engaging the friction mechanism and the arms of the driven plate detachably engaging the first spring mechanism with the predetermined torsional angular gap.

16. The flywheel device according to any one of claims 1, 2 and 3, further comprising a control plate arranged between the driving and driven side flywheels as a vibrational system so as to be rotatable relative to the driving and driven side flywheels and so as to connect the second spring mechanism and the friction mechanism.

17. The flywheel device according to claim 16, wherein the control plate comprises a pair of control plate elements disposed substantially in parallel with each other and coupled to each other by a rivet, the control plate including an annular portion and a plurality of arms extending radially outwardly from the annular portion, the annular portion of the control plate slidably engaging the friction mechanism and the arms of the control plate detachably engaging the second spring mechanism.

18. The flywheel device according to claim 2,
  wherein the flywheel device further comprises a control plate provided coaxially with respect to the driving and driven side flywheels and rotatable relative to the driving and driven side flywheels, the control plate being disposed between the second spring mechanism and the friction mechanism so as to connect the second spring mechanism and the friction mechanism as a vibrational system, the control plate comprising a pair of control plate elements coupled to each other by a rivet which extends between the control plate elements in an axial direction of the flywheel device and which further extends from one of the control plate elements to form a rivet head at one end portion of the rivet;
  wherein the driving side flywheel comprises a pair of driving plates, one of the driving plates having a circumferentially elongated opening and a radially extending slot which opens to the circumferentially elongated opening, the radially extending slot having sides defining the radially extending slot therebetween such that a torsional angular gap equal in gap size to the angular gap with which the first spring mechanism connects the driving and driven side flywheels is provided between each side of the radially extending slot and the rivet head of the rivet connecting the control plate elements; and
  wherein the means for forcibly sliding the friction mechanism comprises the rivet head of the rivet connecting the control plate elements and the sides of the radially extending slot formed in the driving plate.

19. The flywheel device according to claim 3,
  wherein the driven side flywheel comprises a flywheel body opposing the driving side flywheel in an axial direction of the flywheel device and a driven plate including an annular portion and a plurality of arms extending radially outwardly from the annular portion of the driven plate, each of the arms of the driven plate having opposite sides such that a predetermined torsional angular gap with a torsional angle equal to a difference between the angular gap with which the first spring mechanism connects the driving and driven side flywheels is provided between each side of each arm of the driven plate and the second spring mechanism; and
  wherein the means for forcibly operating the second spring mechanism comprises the sides of the arm of the driven plate.

* * * * *